United States Patent [19]

Sano et al.

[11] Patent Number: 4,597,462
[45] Date of Patent: Jul. 1, 1986

[54] STEERING SYSTEM FOR VEHICLES

[75] Inventors: Shoichi Sano, Tokyo; Yoshimi Furukawa, Tochigi, both of Japan

[73] Assignee: Honda Giken Kogyo Kabushiki Kaisha, Tokyo, Japan

[21] Appl. No.: 695,955

[22] Filed: Jan. 29, 1985

[30] Foreign Application Priority Data

Feb. 2, 1984 [JP] Japan .................................. 59-18137

[51] Int. Cl.⁴ .............................................. B62D 5/06
[52] U.S. Cl. ...................................... 180/140; 180/141; 180/143
[58] Field of Search ................. 180/140, 141, 142, 143

[56] References Cited

FOREIGN PATENT DOCUMENTS 2255602  5/1974  Fed. Rep. of Germany ...... 180/143
2083422  3/1982  United Kingdom .

Primary Examiner—John A. Pekar
Attorney, Agent, or Firm—Irving M. Weiner; Joseph P. Carrier; John J. Cantarella

[57] ABSTRACT

A steering system for a vehicle having a steerable front wheel (5) and a steerable rear wheel (11), in which the rear wheel is steered in accordance with a travelling state quantity ($\alpha$, $\nu$) substantially influenced by a disturbance from outside of the vehicle and a vehicle speed (V) of the vehicle.

3 Claims, 4 Drawing Figures

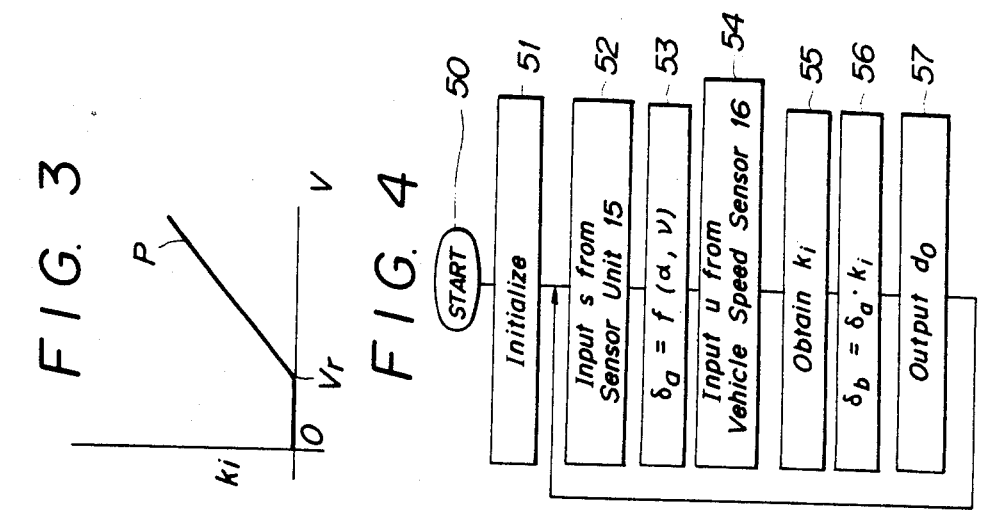

STEERING SYSTEM FOR VEHICLES

BACKGROUND OF THE INVENTION

1. Field of the Invention

The present invention relates generally to a steering system for vehicles. More particularly, the invention relates to a steering system for vehicles of the type in which, in addition to having front wheels which are steerable, the rear wheels are steered in accordance with a travelling state representative quantity of the vehicle.

2. Description of Relevant Art

There have already been proposed a number of steering systems, for vehicles of the type in which, in addition to having front wheels which are steerable, the rear wheels are steered in accordance with a travelling state representative quantity of the vehicle.

For example, in UK patent application GB No. 2,083,422 A published on Mar. 24, 1982, there is disclosed in FIG. 1 thereof a steering system for vehicles in which, to cancel the influence of side winds to the vehicle while travelling, rear wheels are steered on the basis of detected values of the lateral acceleration of the vehicle.

With such a steering system, the maneuverability of the vehicle is favorably improved. However, in addition to the side wind there are other disturbances effecting the vehicle while travelling, such as undulations of the road surface. It is thus preferable to have the rear wheels steered taking into account such factors, whereas it is more preferable to consider the vehicle speed as well, which speed has an effect on the degree of the influence of such disturbances.

The present invention further improves such a conventional steering system for vehicles as described above.

SUMMARY OF THE INVENTION

According to the present invention, there is provided a steering system for a vehicle having a steerable front wheel and a steerable rear wheel, comprising a front wheel steering mechanism for steering the front wheel, and a rear wheel steering mechanism for steering the rear wheel in accordance with a travelling state quantity substantially influenced by a disturbance, the rear wheel steering mechanism including an actuating means for actuating the rear wheel, a first detection means for detecting the travelling state quantity, a second detection means for detecting a vehicle speed of the vehicle, and a control means connected to the first and second detection means and adapted to provide a control signal for the actuating means. The control means has an operation process means adapted for determining a provisional steering quantity of the rear wheel depending on an output signal of the first detection means through a predetermined expression of function, a correction factor corresponding to the vehicle speed from an output signal of the second detection means, and a final steering quantity of the rear wheel based on the predetermined expression of function and the correction factor, and for producing the control signal representing the final steering quantity.

Accordingly, an object of the present invention is to provide a steering system for vehicles which permits a rear wheel to be steered so as to cancel the affect of disturbances taking into account the vehicle speed, to achieve further improved maneuverability.

The foregoing and additional objects and features of the present invention, as well as advantages thereof, will more fully appear from the following detailed description of a preferred embodiment of the invention when read in conjunction with the accompanying drawings.

BRIEF DESCRIPTION OF THE DRAWINGS

FIG. 1 is a plan view schematically showing the constitution of a vehicle equipped with a steering system according to the preferred embodiment of the invention.

FIG. 2 is a functional block diagram of a control part of the steering system of FIG. 1.

FIG. 3 is a plot for aiding in comprehension of the functional block diagram of FIG. 2.

FIG. 4 is a schematic flow chart of a program for a microcomputer of the control part of FIG. 2.

DETAILED DESCRIPTION OF THE PREFERRED EMBODIMENT

Referring first to FIG. 1, designated at reference numeral 1 is a steering wheel of a vehicle 100 shown by dashed line. The steering wheel 1 is provided with a steering shaft 2 assembled into a gearbox 3 of a rack and pinion type and adapted such that, when operated to be rotated, it causes a front tie rod 4 to correspondingly move transversely of the vehicle 100. The tie rod 4 is connected at either end thereof to left and right front knuckle arms 6, 6 supporting left and right front wheels 5, 5, respectively. By virtue of the knuckle arms 6, 6, which are pivotably suspended from a vehicle body (not shown) at left and right pivot points 6a, 6a, respectively, the front wheels 5, 5 are adapted to be steered, when the steering wheel 1 is operated, correspondingly in the same direction as the rotating operation of the steering wheel 1.

On the other hand, in the rear part of the vehicle 100, there is provided another gearbox 7 of a rack and pinion type, to which is connected the rear end of an output shaft 8a extending rearwardly from a rear wheel steering servoactuator 8. The gearbox 7 has a rear tie rod 9 transversely movably provided therethrough, which tie rod 9 is articulated at either end thereof to left and right rear knuckle arms 10, 10 pivotably suspended from the vehicle body at left and right pivot points 10a, 10a, respectively, the knuckle arms 10, 10 supporting left and right rear wheels 11, 11, respectively. In the above arrangement, when the output shaft 8a is caused to revolve, the tie rod 9 has a corresponding transverse displacement, making the knuckle arms 10, 10 pivot about the pivot points 10a, 10a, respectively, whereby the rear wheels 11, 11 are to be steered at a corresponding angle.

To the servo-actuator 8 is supplied a control signal from a computer 12 provided with a sensor unit 15, which includes a lateral acceleration sensor 13 and a roll angle velocity sensor 14, and a vehicle speed sensor 16. The computer 12 receiving respective detection signals of the sensors 13, 14 from the unit 15 and a vehicle speed signal from the sensor 16 is adapted to produce, based on these signals, the control signal supplied to the actuator 8 to thereby steer the rear wheels 11, 11. The sensors 13, 14 and 16, which may be of known types, are adapted to function as means for detecting a lateral acceleration $\alpha$, a roll angle velocity $v$, and a vehicle speed V as travelling state quantites of the vehicle 100, respectively.

In the foregoing arrangement of a steering system according to the invention, the gearbox 3, the front tie rod 4, and the front knuckle arms 6, 6 cooperate with the steering wheel 1 and the steering shaft 2 to constitute a front wheel steering mechanism; and the gearbox 7, the rear tie rod 9, and the rear knuckle arms 10, 10 cooperate with the actuator 8 and the output shaft 8a thereof as well as the computer 12 and the respective sensors 13, 14 and 16 to constitute a rear wheel steering mechanism.

The function of the steering system as well as essential parts thereof will be described detail hereinbelow with reference to FIGS. 2 to 4.

As shown in FIG. 2, the sensor unit 15 is connected to computer 12 as already described and a signal s is input from the sensor 15, which signal s includes the respective detection signals of the lateral acceleration sensor 13 and the roll angle velocity sensor 14 representing the lateral acceleration $\alpha$ and the roll angle velocity $\nu$ of the vehicle 100, respectively.

The computer 12 has an operation process B in which, first, based on the signal s, a provisional steering quantity $\delta_a$ of the rear wheels 11, 11 is determined, depending on a predetermined expression of function f(s), that is, $f(\alpha,\nu)$, stored as part of data A, to thereby compensate an additional steering quantity of the front wheels 5, 5 to compensate for a disturbance from outside of the vehicle 100, whereas the provisional steering quantity $\delta_a = f(\alpha,\nu)$ is substantially the same as that of the aforementioned UK patent application GB No. 2,083,422 A.

Then, at the operation process B, based on a detection signal u of the vehicle speed sensor 16 as the aforesaid vehicle speed signal representing the vehicle speed V of the vehicle 100, a proper one of a plurality of correction factors $k_i$ (where the suffix "i" represents an arbitrary integer between and including 1 and n, that is, $k_i \in \{k_1, k_2, \ldots, k_n \mid k_1 < k_2 < \ldots < k_n \}$) stored as part of the data A is selected to determine a final steering quantity $\delta_b$ of the rear wheels 11, 11 such that $\delta_b = \delta_a \cdot k_i$.

The final steering quantity $\delta_b$ is transmitted in the form of the control signal designated by reference character $d_0$ to the actuator 8, where it is subjected to a digital to analog conversion followed by an amplification stage (not shown) for driving a servomotor (not shown) coupled with the output shaft 8a, to thereby additionally steer the rear wheels 11, 11 at an angle corresponding to the quantity $\delta_b$ from a momentary position at which they have just been positioned.

The correction factor $k_i$ varies with the vehicle speed V, depending on a characteristic curve P plotted in FIG. 3. While the vehicle speed V is not exceeding a predetermined reference speed Vr, the factor $k_i$ is given as $k_1 = 0$. As the vehicle speed V becomes larger than the reference speed Vr, the factor $k_i$ also becomes larger in proportion thereto. Or in other words, for a range of V > Vr, the factor $k_i$ becomes smaller, as the vehicle speed V becomes low.

As will be easily understood, the given function $f(\alpha,\nu)$ is preset in consideration of characteristic development patterns of the lateral acceleration $\alpha$ when the vehicle 100 is intentionally turned and those when it is subjected to side winds, as well as characteristic development patterns of the roll angle velocity $\nu$ such as by road surface conditions including undulations of the road.

Accordingly, against variations in the lateral acceleration $\alpha$ and/or the roll angle velocity $\nu$ due to disturbances from outside of the vehicle 100, the affect to the steering of the vehicle 100 is effectively compensated at relatively high values of the vehicle speed V, where such affect may be large. On the other hand, at middle and relatively low values of the vehicle speed V, where the affect of disturbance is small and the necessity of compensation therefor is not so large, the steering quantity of the rear wheels 11, 11 is rendered relatively small or substantially kept to zero, thereby achieving a normal travelling state. As a result, comfortable travelling is permitted.

Incidentally, the characteristic curve P may be such that the correction factor $k_i$ asymptotically increases as the vehicle speed V increases substantially from a zero value.

The computer 12 is constituted as a microcomputer system provided with necessary integrated circuits (not shown) to exhibit described functions, such as a CPU, a ROM, a RAM, and peripheral interfaces. Respective processes in the computer 12 are executed following a control program software stored in the ROM. In this respect, in place of the computer 12, there may be employed an electric circuit with compatible functions.

FIG. 4 shows a schematic flow chart of a control program stored in the ROM of the computer 12.

The program is designed to start functioning upon a power-on operation or when reset at a stage 50, and makes the initialization of the peripheral interfaces as well as the setting of necessary variants at a stage 51, before the program flow enters a main loop consisting of a plurality of stages 52 to 57.

In the main loop, the signal s representing the lateral acceleration $\alpha$ and the roll angle velocity $\nu$ is input from the sensor unit 15 at the first stage 52 and, at a subsequent stage 53, the provisional steering quantity $\delta_a$ of the rear wheels 11, 11 is determined on the basis of $\alpha$ and $\nu$, following the expression of function $f(\alpha,\nu)$, such that $\delta_a = f(\alpha,\nu)$. Next, at a stage 54, the signal u representing the vehicle speed V of the vehicle 100 is input from the vehicle speed sensor 16, to select based thereon, at a subsequent stage 55, a proper one of the correction factors $k_i$. Then, the program flow enters a stage 56, where the provisional steering quantity $\delta_a$ is multiplied by the correction factor $k_i$ to obtain the final steering quantity $\delta_b$ of the rear wheels 11, 11, and and at the last stage 57, the control signal $d_0$ representing the final steering quantity $\delta_b$ is output to be supplied to the actuator 8, which signal $d_0$ is assigned to be positive or negative to identify the rotating direction of the actuator 8. Thereafter, the flow again goes to the first stage 52.

Incidentally, the sensor unit 15 may further include a yaw rate sensor to permit a preferable steering of the rear wheels 11, 11 also taking into account a yaw rate of the vehicle 100. Moreover, instead of storing in a memory, the correction factors $k_i$ may be directly determined from the vehicle speed V by means of a programmed function. Or otherwise, the given function $f(\alpha,\nu)$ itself may be varied in accordance with the vehicle speed V to directly obtain the final steering quantity $\delta_b$.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A steering system for a vehicle having a steerable front wheel and a steerable rear wheel, comprising:
 a front wheel steering mechanism for steering said front wheel;
 a rear wheel steering mechanism for steering said rear wheel in accordance with a travelling state quantity substantially influenced by a disturbance; and
 said rear wheel steering mechanism including:
  actuating means for actuating said rear wheels;
  first detection means for detecting said travelling state quantity;
  second detection means for detecting a vehicle's speed of said vehicle;
  control means connecting to said first and second detection means and adapted to provide a control signal for said actuating means;
  said control means having an operation process means for determining a provisional steering quantity of said rear wheel depending on an output signal of said first detection means through a predetermined expression of function, a correction factor corresponding to said vehicle speed from an output signal of said second detection means, and a final steering quantity of said rear wheel based on said predetermined expression of function and said correction factor, and for producing said control signal representing said final steering quantity; and
  said correction factor decreases as said vehicle speed decreases.

2. A steering system according to claim 1, wherein:
 said first detection means comprises a lateral acceleration sensor and a roll angle velocity sensor; and
 said control means is adapted to determine said final steering quantity as a product of said provisional steering quantity and said correction factor.

3. A steering system according to claim 2, wherein:
 said control means further has memory means for storing said predetermined expression of function and a plurality of predetermined values of said correction factor; and
 said rear wheel steering mechanism is adapted to steer said rear wheel in accordance with a traveling state quantity substantially influenced by a disturbance from outside of said vehicle.

* * * * *

UNITED STATES PATENT AND TRADEMARK OFFICE
CERTIFICATE OF CORRECTION

PATENT NO. : 4,597,462
DATED : July 1, 1986
INVENTOR(S) : Soichi SANO et al

It is certified that error appears in the above-identified patent and that said Letters Patent are hereby corrected as shown below:

Column 3, line 29 before "to" insert --required--.
Column 5, line 20 change "connecting" to --connected--.

Signed and Sealed this

Thirtieth Day of December, 1986

Attest:

DONALD J. QUIGG

*Attesting Officer*  *Commissioner of Patents and Trademarks*